United States Patent
Moon

(10) Patent No.: US 8,661,474 B2
(45) Date of Patent: Feb. 25, 2014

(54) MOBILE TERMINAL AND DIGITAL BROADCAST RECEIVING METHOD THEREOR

(75) Inventor: Chan Young Moon, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 1187 days.

(21) Appl. No.: 11/776,394

(22) Filed: Jul. 11, 2007

(65) Prior Publication Data

US 2008/0022314 A1   Jan. 24, 2008

(30) Foreign Application Priority Data

Jul. 20, 2006 (KR) .......................... 10-2006-0068115

(51) Int. Cl.
*H04N 7/16* (2011.01)

(52) U.S. Cl.
USPC .......................................................... 725/62

(58) Field of Classification Search
USPC .......................................................... 725/62
See application file for complete search history.

(56) References Cited

U.S. PATENT DOCUMENTS

| | | | | |
|---|---|---|---|---|
| 4,356,509 A * | 10/1982 | Skerlos et al. | ................. | 348/552 |
| 5,729,825 A * | 3/1998 | Kostreski et al. | ................. | 725/62 |
| 5,867,227 A * | 2/1999 | Yamaguchi | ..................... | 725/56 |
| 6,300,981 B1 * | 10/2001 | Kim et al. | ..................... | 348/563 |
| 6,459,906 B1 * | 10/2002 | Yang | .......................... | 455/556.1 |
| 6,480,753 B1 * | 11/2002 | Calder et al. | .................... | 700/83 |
| 7,032,001 B1 * | 4/2006 | Herrod et al. | ................. | 709/203 |
| 7,751,849 B2 * | 7/2010 | Hamamura et al. | ........ | 455/550.1 |
| 7,999,788 B2 * | 8/2011 | Schohn et al. | ................. | 345/156 |
| 2003/0020693 A1 * | 1/2003 | Nashida et al. | ................ | 345/169 |
| 2003/0163443 A1 * | 8/2003 | Wang | ................................ | 707/1 |
| 2003/0179320 A1 * | 9/2003 | Kim | ................................ | 348/732 |
| 2004/0073933 A1 * | 4/2004 | Gollnick et al. | ................. | 725/81 |
| 2005/0015811 A1 * | 1/2005 | Norman | .......................... | 725/126 |
| 2005/0153729 A1 * | 7/2005 | Logan et al. | ................ | 455/550.1 |
| 2005/0193425 A1 * | 9/2005 | Sull et al. | ......................... | 725/135 |
| 2006/0005219 A1 * | 1/2006 | Owens | ............................. | 725/33 |
| 2006/0015894 A1 * | 1/2006 | Nishinaga et al. | ............... | 725/30 |
| 2006/0026653 A1 * | 2/2006 | Matsunami | ...................... | 725/81 |
| 2006/0161957 A1 * | 7/2006 | Lee et al. | ........................ | 725/62 |
| 2006/0253875 A1 * | 11/2006 | Choi et al. | ...................... | 725/62 |
| 2006/0294539 A1 * | 12/2006 | Kim et al. | ...................... | 725/28 |
| 2007/0129003 A1 * | 6/2007 | Dunko | .......................... | 455/3.06 |
| 2007/0281730 A1 * | 12/2007 | Ichi | ............................. | 455/550.1 |
| 2008/0022314 A1 * | 1/2008 | Moon | ............................. | 725/62 |
| 2008/0125180 A1 * | 5/2008 | Hoffman et al. | .............. | 455/566 |
| 2010/0029303 A1 * | 2/2010 | Lim et al. | ...................... | 455/466 |
| 2010/0167787 A1 * | 7/2010 | Weisbrod | ...................... | 455/566 |

FOREIGN PATENT DOCUMENTS

| | | |
|---|---|---|
| CN | 1298602 A | 6/2001 |
| KR | 10-2001-0076450 A | 8/2001 |
| KR | 10-2004-0060520 A | 7/2004 |
| WO | WO 2006/022523 A1 | 3/2006 |

* cited by examiner

*Primary Examiner* — Brian Pendleton
*Assistant Examiner* — Jonathan V Lewis
(74) *Attorney, Agent, or Firm* — Birch, Stewart, Kolasch & Birch, LLP

(57) ABSTRACT

A mobile terminal and digital broadcast receiving method thereof are disclosed, by which complicated procedures for digital broadcast reception in a mobile communication terminal can be simplified for user's convenience. The method according to an embodiment includes recognizing a number inputted via an input unit of the terminal in a standby mode, deciding whether a broadcast channel mapped by the inputted number exists in a memory, reading broadcast information for the broadcast channel mapped by the inputted number from digital multimedia service data and then displaying the broadcast information on a prescribed area of a display unit, and if a control signal for a digital broadcast reception is inputted while the broadcast information for the broadcast channel is displayed, entering a digital broadcast receiving mode of the broadcast channel.

17 Claims, 9 Drawing Sheets

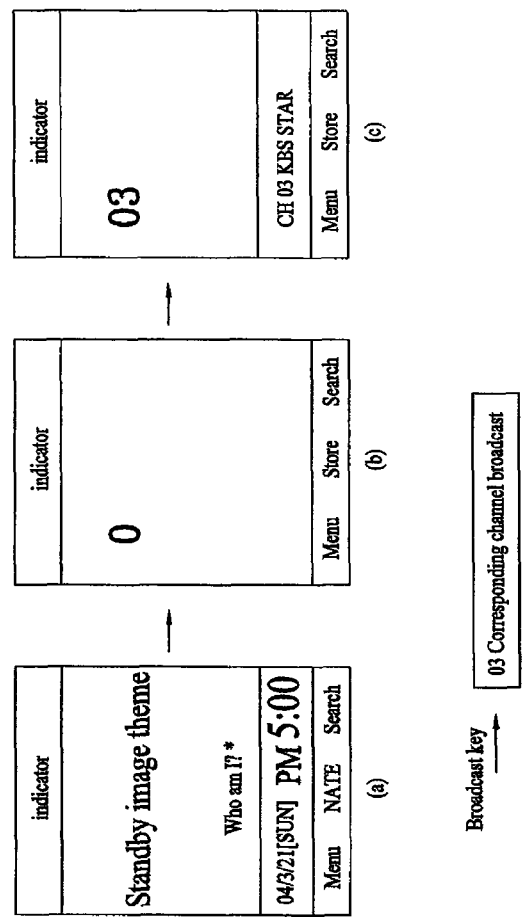

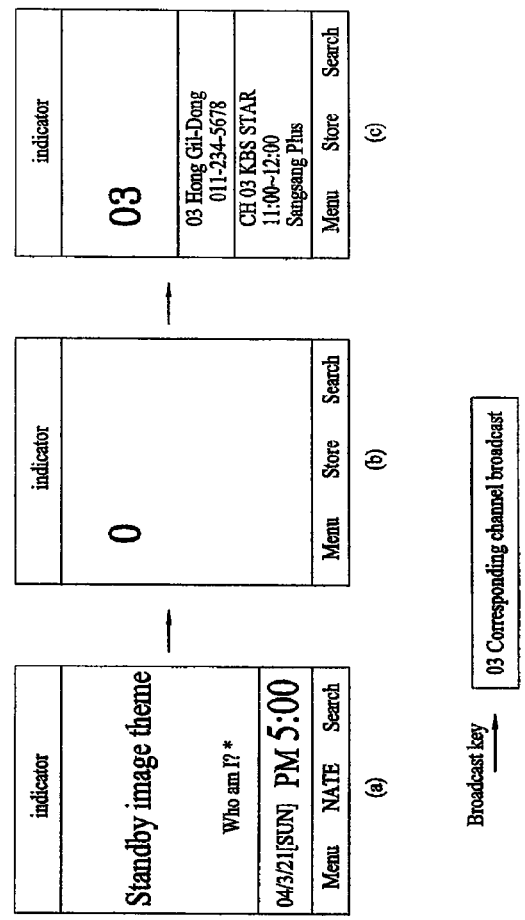

FIG. 7
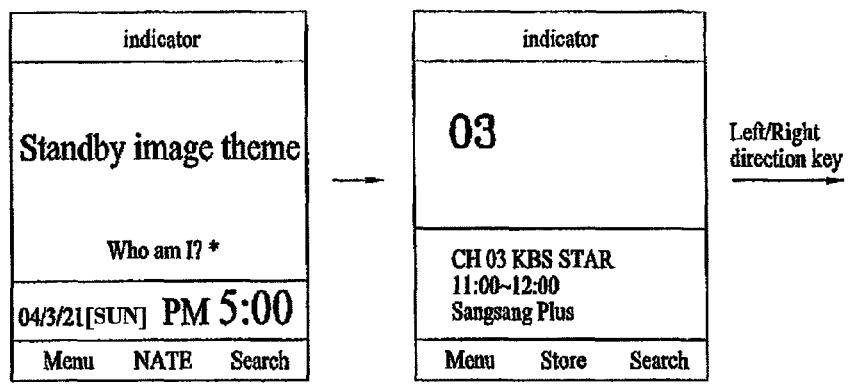
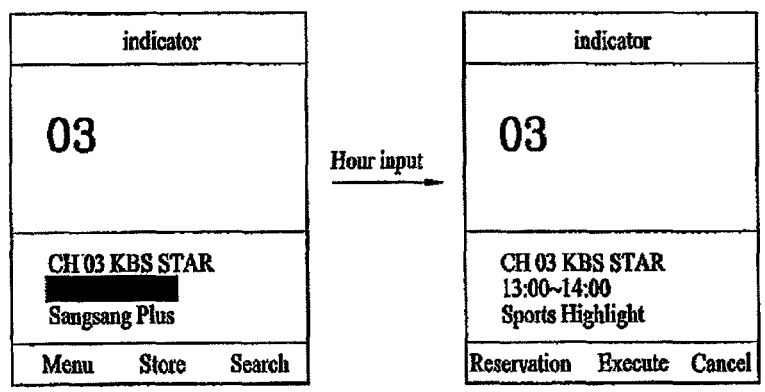

MOBILE TERMINAL AND DIGITAL BROADCAST RECEIVING METHOD THEREOR

This application claims the priority benefit of the Korean Patent Application No. 10-2006-0068115, filed on Jul. 20, 2006, which is hereby incorporated by reference as if fully set forth herein.

BACKGROUND OF THE INVENTION

1. Field of the Invention

The present invention relates to a terminal having a broadcast receiving function, and more particularly, to a mobile terminal and digital broadcast receiving method thereof. Although the present invention is suitable for a wide scope of applications, it is particularly suitable for displaying broadcast channel information in a standby image of the terminal by the same system of abbreviated dialing and receiving a broadcast by entering a corresponding channel directly.

2. Discussion of the Related Art

Generally, a process for receiving a digital broadcast using a mobile communication terminal capable of digital broadcast reception is explained as follows. In the following description, digital broadcasting belongs to digital broadcast reception using a satellite or terrestrial digital broadcasting. The digital broadcast reception via a satellite differs from the digital broadcast reception via a terrestrial broadcast relay in a receiving system. Yet, the present invention relates to a method of facilitating a broadcast reception no matter what kind of broadcasting the terminal receives, regardless of a broadcasting type difference.

FIG. 1 is an exemplary flowchart of a process for entering a digital broadcast receiving mode using a terminal according to a related art.

Referring to FIG. 1, a menu button for entering a broadcast receiving mode is used on a call standby image (S101). In this case, if a hot key for a broadcast reception is separately provided to a terminal and is selected, it is able to directly enter the broadcast receiving mode (S102).

If a broadcast reception is selected on a menu image, another image for selecting one of various items including TV, radio, data, separately set contents, and the like is provided.

Assuming that the TV is selected from the various items, a random TV broadcast is selected to execute a receiving operation. In doing so, a user manipulates a keypad to search for a specific channel (S103).

Thus, after a digital broadcast receiving mode has been entered, channels are searched. A specific channel is then selected. This method, however, is inconvenient to a user who has known the desired specific broadcast channel in advance.

SUMMARY OF THE INVENTION

Accordingly, the present invention is directed to a mobile terminal and digital broadcast receiving method thereof that substantially obviate one or more problems due to limitations and disadvantages of the related art.

An object of the present invention is to provide a mobile terminal and digital broadcast receiving method thereof, by which complicated procedures for a digital broadcast reception in a mobile communication terminal can be simplified for a user's convenience.

Another object of the present invention is to provide a mobile terminal and digital broadcast receiving method thereof, by which a time taken to prepare for a digital broadcast reception can be reduced.

Another object of the present invention is to provide a mobile terminal and digital broadcast receiving method thereof, by which broadcast information for a current hour can be provided via a standby image on a terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of receiving a digital broadcast in a terminal according to an aspect of the present invention includes a step (a) of recognizing a number inputted via a keypad of the terminal in a standby mode, a step (b) of deciding whether a broadcast channel mapped by the inputted number exists in a memory, a step (c) of reading information for the broadcast channel mapped by the inputted number from digital multimedia service data (EPG) stored in the memory and then displaying broadcast information for a corresponding channel on a prescribed area of a display unit, and a step (d) of if a control signal for a digital broadcast reception is inputted, entering a digital broadcast receiving mode of the corresponding channel.

Preferably, the digital broadcast includes one selected from the group consisting of a TV broadcast, a radio broadcast, and a data broadcast.

Preferably, in correspondence to implementation of an abbreviated dialing function according to the number inputted via the keypad, a corresponding phone number is displayed.

Preferably, if an up or down direction key is inputted while the broadcast channel information is displayed, a displayed number is changed to correspond to the inputted direction key and it is then decided whether there exists the broadcast channel mapped by a corresponding number.

Preferably, the method further includes the step of if either a left direction key or a right direction key is inputted while the broadcast channel information is displayed, standing by for an input signal of a user by shifting a current cursor to a broadcast channel information display area.

More preferably, the method further includes the steps of reading broadcast information corresponding to a condition inputted by the user from the EPG and displaying the read broadcast information.

More preferably, the method further includes the steps of displaying a reservation item on a soft menu area and if the user selects a reservation function, performing a reserved recording meeting the condition inputted by the user.

More preferably, the method further includes the step of if a photographing dedicated key is inputted while the broadcast information corresponding to the condition inputted by the user is displayed, performing a reserved recording meeting the inputted condition.

In another aspect of the present invention, a mobile communication terminal having a digital broadcast receiving function includes a keypad, a memory storing broadcast channel information, a control unit outputting a control signal for extracting the broadcast channel information mapped by a number inputted via the keypad from the memory and displaying the extracted broadcast channel information to be recognizable by a user, and a display unit displaying the broadcast channel information mapped by the inputted number in correspondence to the control signal from the control unit.

According to another aspect, the present invention provides a method of receiving a digital broadcast in a terminal, comprising: recognizing a number inputted via an input unit of the terminal in a standby mode; deciding whether a broadcast channel mapped by the inputted number exists in a memory; reading broadcast information for the broadcast channel mapped by the inputted number from digital multimedia service data and then displaying the broadcast information on a prescribed area of a display unit; and entering a digital broadcast receiving mode of the broadcast channel, if a control signal for a digital broadcast reception is inputted while the broadcast information for the broadcast channel is displayed.

According to another aspect, the present invention provides a terminal having a digital broadcast receiving function, comprising: an input unit; a memory to store broadcast channel information; a control unit to output at least one control signal for extracting the broadcast channel information mapped by a number inputted via the input unit from the memory and displaying the extracted broadcast channel information to be recognizable by a user; and a display unit to display the broadcast channel information mapped by the inputted number in correspondence to the control signal from the control unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4A and FIG. 4B are exemplary diagrams for an image transition process according to one embodiment of the present invention;

FIG. 5 is an exemplary diagram for an image transition process according to another embodiment of the present invention;

FIG. 7 is an exemplary diagram for an image transition process according to another further embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, a terminal in the following description includes a terminal capable of a digital broadcast reception such as a terminal having a mobile communication function, a digital broadcast reception dedicated terminal, etc. The terminal in the present invention is not limited to a mobile terminal.

Figure 1:
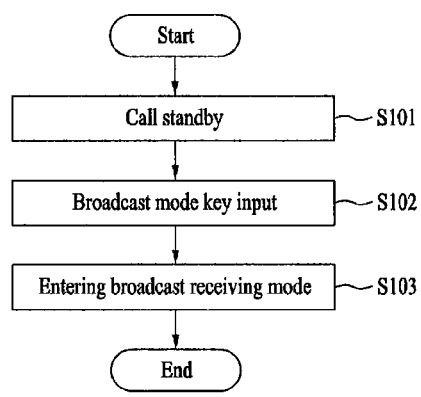
FIG. 1 is an exemplary flowchart of a process for entering a digital broadcast receiving mode using a terminal according to a related art.
Figure 2:
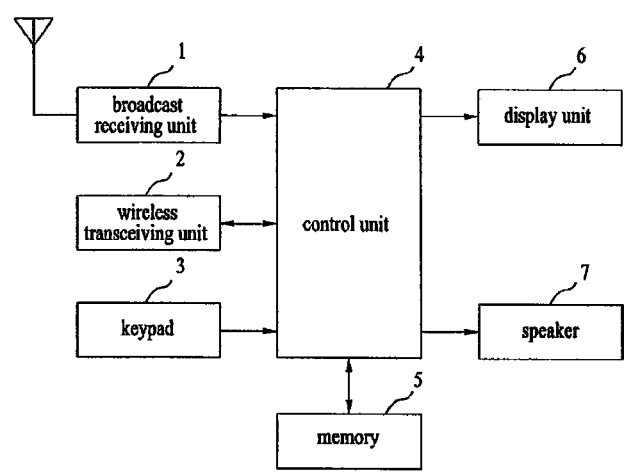
FIG. 2 is a schematic block diagram of a mobile communication terminal according to an embodiment of the present invention.

FIG. 2 is a schematic block diagram of a mobile communication terminal according to an embodiment of the present invention.

Referring to FIG. 2, a mobile communication terminal according to an embodiment of the present invention includes a broadcast receiving unit 1 for receiving broadcast signals, a wireless transceiving unit 2 for performing a mobile communication function via wireless signal transmissions and receptions with a base station, an input unit such as a keypad 3, a memory 5 for storing broadcast channel information received by the broadcast receiving unit 1, a control unit 4 for outputting a control signal for displaying the broadcast channel information, which is mapped to a number inputted via the keypad 3 and extracted from the memory 5, to be recognizable to a user, a display unit 6 for displaying the broadcast channel information mapped according the control signal from the control unit 4, and a speaker 7 for outputting sounds. The mobile terminal may include other components, and all components of the mobile terminal are operatively coupled.

Figure 3:
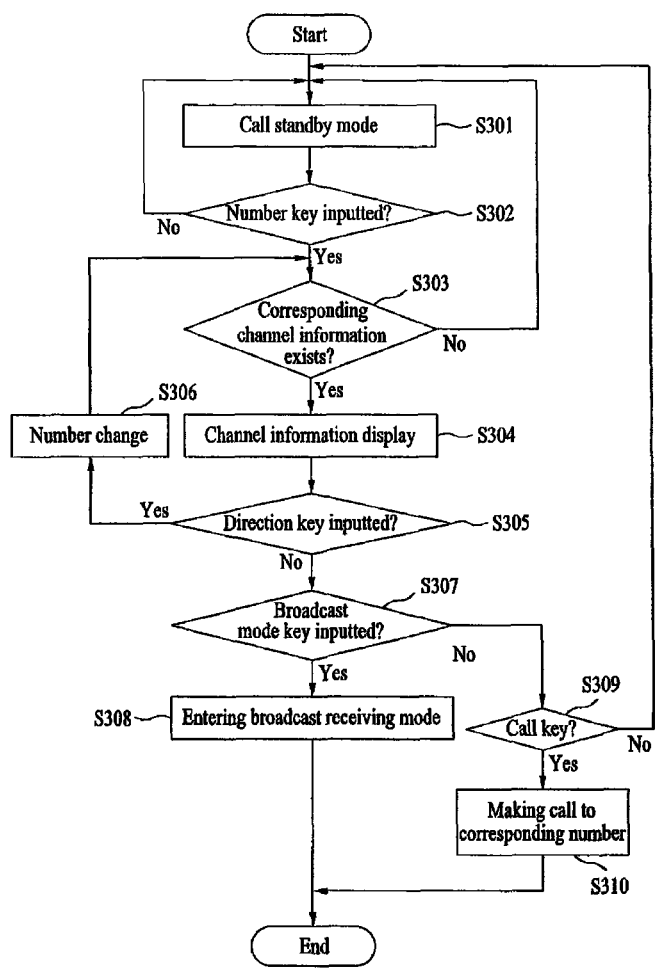
FIG. 3 is a flowchart of a process for entering a digital broadcast receiving mode using a terminal according to an embodiment of the present invention.

FIG. 3 is a flowchart of a process for entering a digital broadcast receiving mode using a terminal according to the present invention, and FIGS. 4A to 7 are exemplary diagrams for illustrating a process for switching images appearing in correspondence to the implementation procedures of the present invention. The methods of FIGS. 3-7 can be implemented by a terminal, the mobile terminal of FIG. 2 or other suitable device.

Preferably, the implementation of the present invention is carried out on the assumption that an electronic program guide (hereinafter abbreviated as EPG) is stored in a memory such as the memory 5 of the mobile terminal. In this case, the EPG, which is the data including organization information for digital broadcast programs, is received via a broadcast receiving unit (e.g., the unit 1) and then stored in a memory (e.g., the memory 5).

First of all, a terminal not in a call mode normally maintains a standby mode as shown in (a) in FIGS. 4A to 7 (S301).

Figure 4B:
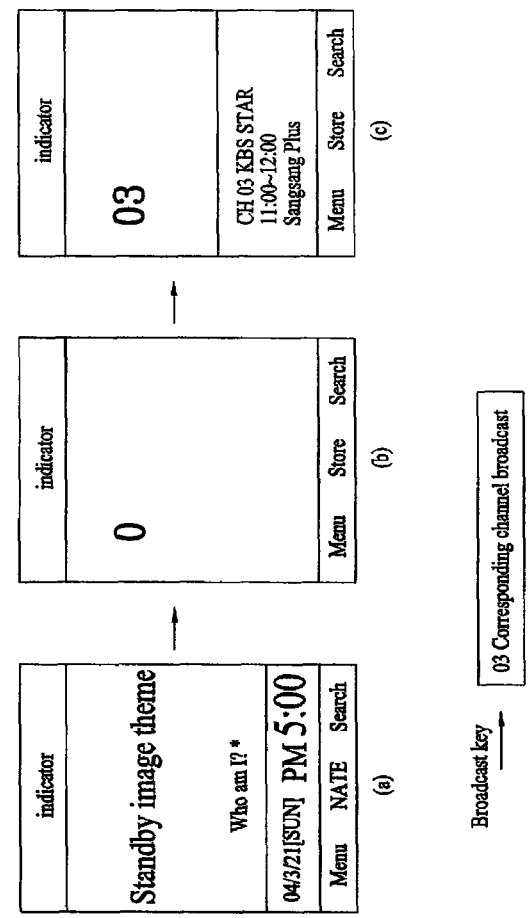

A user attempting to receive a digital broadcast, e.g., a TV, radio or data broadcast, as shown in (b) of FIGS. 4A and 4B or FIG. 5, inputs a number using a keypad (e.g., the keypad 3) of the terminal (S302). Here, the number can be a channel number, a speed dial number, etc. but can represent other information.

A control unit (e.g., the control unit 4) of the terminal recognizes the inputted number and then decides whether information of a broadcast channel mapped by the inputted number exists in the memory of the terminal (S303). If the corresponding channel information does not exist in the memory, a routine goes back to a call standby mode (S301).

On the other hand, if the corresponding channel information exists in the memory at step S303, the corresponding broadcast channel information, as shown in (c) of FIGS. 4A and 4B, is displayed on a prescribed area of a display device such as the display unit 6 (S304). As a variation, a phone number and/or other information such as the name of a person, as shown in (c) of FIG. 5, stored in association with the number inputted at step S302 according to an abbreviated dialing function can be displayed together with the broadcast channel information.

Under this circumstance, various actions can be taken in correspondence to signals inputted via the keypad (S304) and their embodiments are explained with reference to the attached drawings.

Conditions for inputs via the keypad of the terminal can be classified into four cases as follows according to an aspect of the present invention.

First of all, if a broadcast dedicated key for a broadcast reception is inputted/selected, the terminal enters a mode for receiving a digital broadcast mapped by the number inputted via the keypad. In this case, the digital broadcast can be one of a TV broadcast, a radio broadcast, and a data broadcast. Steps S307 and 308 are directed to this case.

Secondly, if a call key/button to an abbreviated phone number (e.g., speed dialing) assigned to a number inputted to the terminal is selected, the terminal dials the phone number. This function is used according to known techniques. So, details of this function are omitted in the following description. A call can be established via the phone number displayed on the display unit of the terminal. Steps S309 and S310 are directed to this case.

Figure 6:
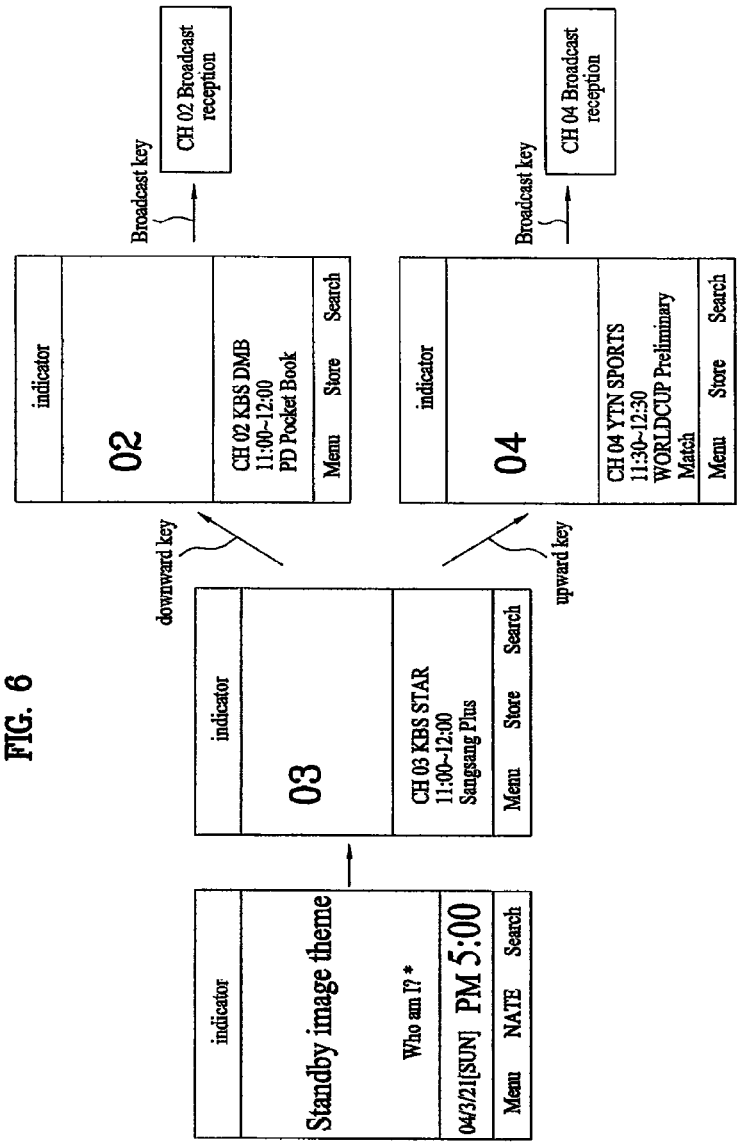
FIG. 6 is an exemplary diagram for an image transition process according to a further embodiment of the present invention.

Thirdly, an up/down direction key on the terminal can be used to increase/decrease a currently inputted number, as shown in FIG. 6. The up/down direction key corresponds to a navigation key mostly provided to the terminal. In some cases, the up/down direction key can be replaced with an up/down button provided for volume adjustment on a lateral side of the terminal. In one example as shown in FIG. 6, assuming that a currently inputted number is '3' (or '03') and that a digital TV channel 'KBS STAR' is stored in association with the number '3' (or '03'), then the corresponding information (e.g., channel 3 program information) is displayed on a prescribed area of a standby image. If the up direction key is pressed, a number on the standby image is changed into '4' (or '04') and the broadcast channel information mapped by the number '4' (or '04') is displayed on the broadcast channel information display area of the terminal. On the other hand, if the down direction key is pressed, a number on the standby image is changed into '2' (or '02') and the broadcast channel information mapped by the number '2' (or '02') is displayed on the broadcast channel information display area. If channel information mapped by a corresponding number does not exist in both of these cases, a message indicating that the corresponding channel information does not exist is displayed on the terminal to enable a user to recognize the situation. In FIG. 6, steps S305 and S306 are directed to this case.

Finally, a left/right direction key for reservation using the currently displayed broadcast channel information can be inputted. The left/right direction key on the terminal can be implemented using a navigation key provided to a general terminal like the up/down direction key. The left/right direction key plays a role similar to that of a tab key of a computer. In particular, the left/right direction key plays a role in shifting a position of a cursor (prompt), as shown in FIG. 7, to a channel information display area of the display unit. Thus, the cursor or prompt is shifted to the channel information display area to perform a reservation function.

For instance, it is assumed that a program called 'Sangsang Plus' is broadcasted on a 'KBS STAR' channel (channel 03) at a current hour (11:30 a.m.) as shown on the display unit of FIG. 7. If a user presses a left or right direction key, a prompt is shifted to the broadcast information display area of the display unit. If the user inputs a specific time (e.g., 13:00) to a time zone, the control unit reads an EPG stored in a memory (in the terminal or accessible by the terminal). Subsequently, broadcast information ('Sports Highlight') of the inputted time is displayed on the broadcast information display area of the display unit and a 'reservation' menu is displayed on a soft menu, e.g., as the bottom area of the screen. While this specific information is displayed, the user is able to perform a reservation of a particular program or channel using the soft menu, for various use such as recording, time-playing, etc. In another example, according to the setup of the terminal, a reservation operation can be implemented by using a dedicated button provided for photographing on a lateral side of the terminal, instead of using the soft menu. In FIG. 3, steps S305 and S306 can be directed to this case.

As shown in steps S305-S310, depending on which keys are inputted, the terminal performs function(s) associated with the inputted key(s). The order of these steps can vary as desired.

Figure 8A:
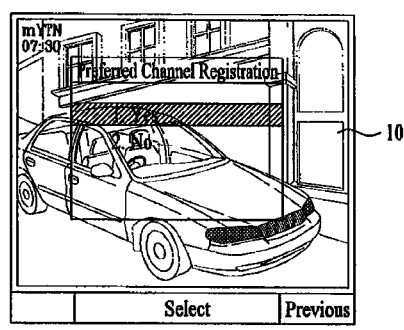
FIG. 8A and FIG. 8B are exemplary diagrams of channel registering images according to an embodiment of the present invention.
Figure 8B:
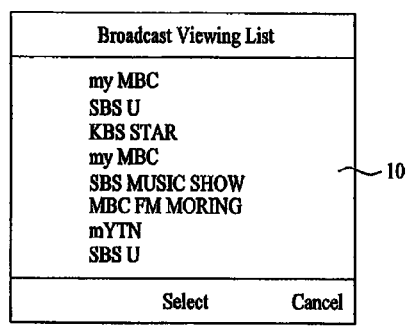

FIG. 8A shows a case that a user registers a channel using a menu key of a terminal in the course of viewing a broadcast according to an aspect of the present invention. A digital TV, radio or data broadcast currently implemented via a terminal can be registered to a user-specific number. This technology is similar to a method of storing an abbreviated dial in a mobile communication terminal. FIG. 8B exemplarily shows a method of storing a specific channel by reading a broadcast viewing list stored in a memory according to an aspect of the present invention. The storage method can be implemented in various ways. There may be a method of giving a number according to a series of storage sequence or a method of setting a storage to a user-specific number. If there exists a broadcast channel previously stored in a user-specific number or a same broadcast channel is already stored, it is apparent to those skilled in the art that there can be many modifications for enabling a user to recognize the channel storage status. In another example, a user's favorite channel information/list can be stored in a mobile terminal.

Accordingly, the present invention provides the following effect or advantage.

First of all, in a mobile communication terminal or other type of terminal according to the present invention, broadcast channel information mapped by a number inputted via a keypad is displayed to a user and a reception mode can be entered in correspondence to a dedicated key input. Hence, procedures required for a digital broadcast reception can be simplified. Further, other keys may be selected to change the channel information or to make a call or to make a program reservation. The present invention provides a simplified, yet effective way to control various functions of the terminal using minimal key manipulation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A method of receiving a digital broadcast in a mobile terminal, comprising:
displaying, via a display unit of the mobile terminal, a standby screen representing a standby mode of the mobile terminal, wherein when the mobile terminal is in the standby mode, the mobile terminal is not receiving the digital broadcast and during the standby mode, the mobile terminal:
- recognizes a number input via an input unit of the mobile terminal;
- searches for a broadcast channel mapped by the input number in a memory while displaying the standby screen;
- reads broadcast information for the broadcast channel mapped by the input number from digital multimedia service data;
- displays the broadcast information on a prescribed area of the displayed standby screen; and
- simultaneously displays, on the display unit, a phone number corresponding to the input number according to an abbreviated dialing function of a call mode of the mobile terminal; and
- entering a digital broadcast receiving mode of the broadcast channel, if a control signal for a digital broadcast reception is received, while the broadcast information for the broadcast channel is displayed,
- wherein when the mobile terminal is in the digital broadcast receiving mode, the mobile terminal is configured to receive the digital broadcast.

2. The method of claim 1, wherein the digital broadcast receiving mode of the broadcast channel receives a digital broadcast of the broadcast channel, and the digital broadcast comprises one selected from the group consisting of a TV broadcast, a radio broadcast, and a data broadcast.

3. The method of claim 1, further comprising:
making a call based on the display phone number, if a call key is selected.

4. The method of claim 1, further comprising:
if an up or down direction key is selected while the broadcast information is displayed, changing a displayed number to correspond to the input direction key; and
deciding whether there exists a broadcast channel mapped by the changed number.

5. The method of claim 1, further comprising:
if either a left direction key or a right direction key is selected while the broadcast information is displayed, standing by for an input signal of a user by shifting a current cursor to the prescribed area of the display unit displaying the broadcast information.

6. The method of claim 5, further comprising:
reading broadcast information corresponding to a condition input by the user from the digital multimedia service data; and
displaying the read broadcast information.

7. The method of claim 6, further comprising:
displaying a reservation function item on a soft menu area of the display unit; and
if the user selects the reservation function item, performing a reserved recording meeting the condition input by the user.

8. The method of claim 6, further comprising:
if a photographing dedicated key is selected while the broadcast information corresponding to the condition input by the user is displayed, performing a reserved recording meeting the input condition.

9. The method of claim 1, wherein the digital multimedia service data includes electronic program guide (EPG) data.

10. A mobile terminal having a digital broadcast receiving function, comprising:
- an input unit;
- a memory configured to store broadcast channel information;
- a control unit, during a standby mode, configured to
  - recognize a number input via the input unit,
  - output at least one control signal for searching the broadcast channel information mapped by a number input via the input unit from the memory while a standby screen representing the standby mode is displayed,
  - read the broadcast channel information for the broadcast channel mapped by the input number from digital multimedia service data;
  - display the searched broadcast channel information on a prescribed area of the displayed standby screen; and
  - simultaneously display, on the display unit, a phone number corresponding to the input number according to an abbreviated dialing function of a call mode of the mobile terminal; and
- a display unit configured to display the standby screen and the broadcast channel information mapped by the input number in correspondence to the control signal from the control unit,
- wherein when the mobile terminal is in the standby mode, the mobile terminal is not receiving the digital broadcast.

11. The mobile terminal of claim 10, further comprising:
a broadcast mode key to enter a digital broadcast receiving mode for receiving a digital broadcast of the broadcast channel information, if the broadcast mode key is selected while the broadcast channel information is displayed,
wherein when the mobile terminal is in the digital broadcast receiving mode, the mobile terminal is configured to receive the digital broadcast.

12. The mobile terminal of claim 11, wherein the digital broadcast comprises one selected from the group consisting of a TV broadcast, a radio broadcast, and a data broadcast.

13. The mobile terminal of claim 10, further comprising:
a call key to dial the displayed phone number, if the call key is selected while the broadcast channel information is displayed.

14. The mobile terminal of claim 10, further comprising:
an up and/or down direction key to change a number included in the displayed broadcast channel information.

15. The mobile terminal of claim 10, further comprising:
at least one of a left direction key and a right direction key to shift a current cursor of the mobile terminal to the displayed broadcast channel information, for modifying the displayed broadcast channel information.

16. The mobile terminal of claim 15, wherein if the displayed broadcast channel information is modified by an operation of the at least one of the left and right direction keys, and if a reservation function is selected by the user while the modified broadcast channel information is displayed, the control unit performs the reservation function on the modified broadcast channel information.

17. The mobile terminal of claim 10, wherein the broadcast channel information stored in the memory includes electronic program guide (EPG) information.

* * * * *